Nov. 3, 1970 W. ZUCKERMAN 3,538,258

TIME MEASURING AND COUNTING APPARATUS

Filed April 3, 1968 2 Sheets-Sheet 1

INVENTOR.
WALTER ZUCKERMAN
BY Beehler & Arant
LAWRENCE V. LINK, JR.
ATTORNEYS

TIME MEASURING AND COUNTING APPARATUS

Filed April 3, 1968 2 Sheets-Sheet 2

INVENTOR.
WALTER ZUCKERMAN
BY Buehler & Arant
LAWRENCE V. LINK, JR.
ATTORNEYS

United States Patent Office
3,538,258
Patented Nov. 3, 1970

3,538,258

TIME MEASURING AND COUNTING APPARATUS

Walter Zuckerman, 15622 Royal Ridge Road, Sherman Oaks, Calif. 91403

Filed Apr. 3, 1968, Ser. No. 718,528
Int. Cl. H04m *15/18*
U.S. Cl. 179—7.1 13 Claims

ABSTRACT OF THE DISCLOSURE

An apparatus for monitoring the usage of a telephone line comprising, in combination with a "line in use" lamp; a monitor unit, a sensor unit, and a remote control unit. The sensor unit includes a light transducer which, in response to light energy emitted by the "line in use" lamp, activates the monitor unit when a telephone call is initiated. The monitor unit includes time delay and holding relay circuits for providing adjustable time delays to simulate the time required for dialing a call, and for the call to be answered after the dialing has been completed. At the end of the delay periods, the elapsed time of the use of the line is automatically registered by a clock device having a digital readout display. Also after the end of the delay periods, the call is counted by a counter device having a digital readout display. A remote control unit is electrically connected to the monitor unit, and the remote control unit incorporates manually actuated control circuits by means of which a remotely located operator, when available, may control the start of the elapsed time recording period.

BACKGROUND OF THE INVENTION

This invention relates generally to a time measuring and counting apparatus, and specifically to an apparatus for measuring the utilization time of a telephone line and for counting the number of calls placed.

In certain type telephone contracts, such as the wide area telephone service (WATS) arrangement, a minimum rate is charged for the use of a leased line up to a specified number of hours per billing period. According to these service contracts an additional fee is charged if the line is used in excess of the specified basic time period. Therefore it would be advantageous to the users of such leased lines to have an accurate indication of the utilization time before the end of the billing period, so that the maximum usage of the line may be realized without exceeding the basic time allocation. Also a record of the number of calls placed during a given period is desirable information from which a business organization can analyze its usage of the telephone service. Further if several devices for monitoring a particular leased line are connected in conjunction with each of a number of telephone extensions, a business organization may better estimate the efficiency of the telephone usage by each of its departments.

Heretofore a number of devices have been proposed for measuring the usage of a telephone line. However these prior art devices have generally been of a complex mechanical nature, comparatively expensive, and have required either mechanical or electrical connections to the telephone instrument.

SUMMARY OF THE INVENTION

Briefly the subject invention comprises a sensor unit which actuates a monitor unit in response to illumination from a "line in use" lamp (busy lamp). The "line in use" lamp is provided by the several telephone companies as a standard service at a nominal fee, and the light emitted therefrom is the only connection between the apparatus of the subject invention and the telephone system. Upon initiation of a call on a selected leased line, the light energy emitted by the "line in use" lamp is sensed by a light sensitive resistor which in turn activates first and second delay circuits. The delay period of the first delay circuit may be preadjusted so as to simulate the average time required for dialing. After the dialing delay period, the second adjustable delay circuit is actuated, and the delay thereof may be preset to simulate the average time period between the completion of dialing a number and when the call is answered. At the end of the second delay period, a clock device is energized so as to accumulate the time of use of the line, and the call is then registered by a counter which is incremented by one count. Upon termination of the call the "line in use" lamp is extinguished and in response thereto the light sensitive resistor controls the operation of the monitor so that the clock ceases accumulating time. If the call is terminated before the end of the first and second delay periods, the apparatus of the subject invention automatically returns to a standby status and no elapsed time or increase in the number of calls counted is recorded.

The time periods during which the dialing and ringing phases of placing a call are simulated, as well as the duration of the utilization period, are indicated on a display panel of the monitor unit and at a remote location, for example at a switch board, on a remote control unit. The remote control unit also includes an override circuit which is electrically coupled to the monitor unit so that the clock commences recording time immediately upon the application of a manual control signal. This remote control feature allows for increased accuracy when an operator is available. However it should be noted that one of the primary objectives of the subject invention is to provide a reasonably accurate estimate of the usage of a leased line and that complete accuracy is not required. Further it should be understood that although the preferred embodiment of the subject invention described herein relates to usage in association with a telephone leased line, that the utilization is not restricted thereto. In general the apparatus in accordance with the principles of the subject invention may be used for any application which requires an accurate estimate of the total elapsed time, after a sequence of preset delay periods, between the start and termination of a command signal. For example, the apparatus of the subject invention may be used to monitor teletype and television leased circuits or business machine usage where delay periods are involved between requested access to the lines or devices and actual utilization of the lines or devices. Also the apparatus of the subject invention may be utilized in time and motion studies in which variable delay periods are allowed after an initiation signal.

Therefore it is an object of the subject invention to provide an apparatus for accurately estimating the total elapsed time, after preset delay periods, between the initiation and termination of a command signal, and for counting the number of occurrences of command signals of a duration longer than the delay periods.

It is another object to provide an efficient and economical apparatus for measuring the time duration of utilization of a leased line and for counting the number of calls placed.

It is a further object of the subject invention to provide a reliable apparatus, for measuring the usage of a telephone line, which does not require electrical or mechanical connections to the telephone system.

It is still another object to provide an apparatus for accumulating an estimate of the usage of a telephone line with said apparatus including remote control means for increasing the accuracy of the estimate, if desired.

It is a further object to provide an apparatus which is capable of accurately and reliably estimating the usage of a telephone line by simulating the time periods which occur after the line is activated but before the call is completed.

A further object is to provide an apparatus for measuring the usage of a telephone line by sensing the light emitted from a "line in use" lamp and by compensating for dialing and ringing delay periods.

With these and other objects in view, the invention consists in the construction, arrangement and combination of the various parts of the device, whereby the objects contemplated are attained as herein set forth, pointed out in the appended claims, and illustrated in the accompanying drawings.

DESCRIPTION OF THE PREFERRED EMBODIMENT

Figures 1, 2, 4:
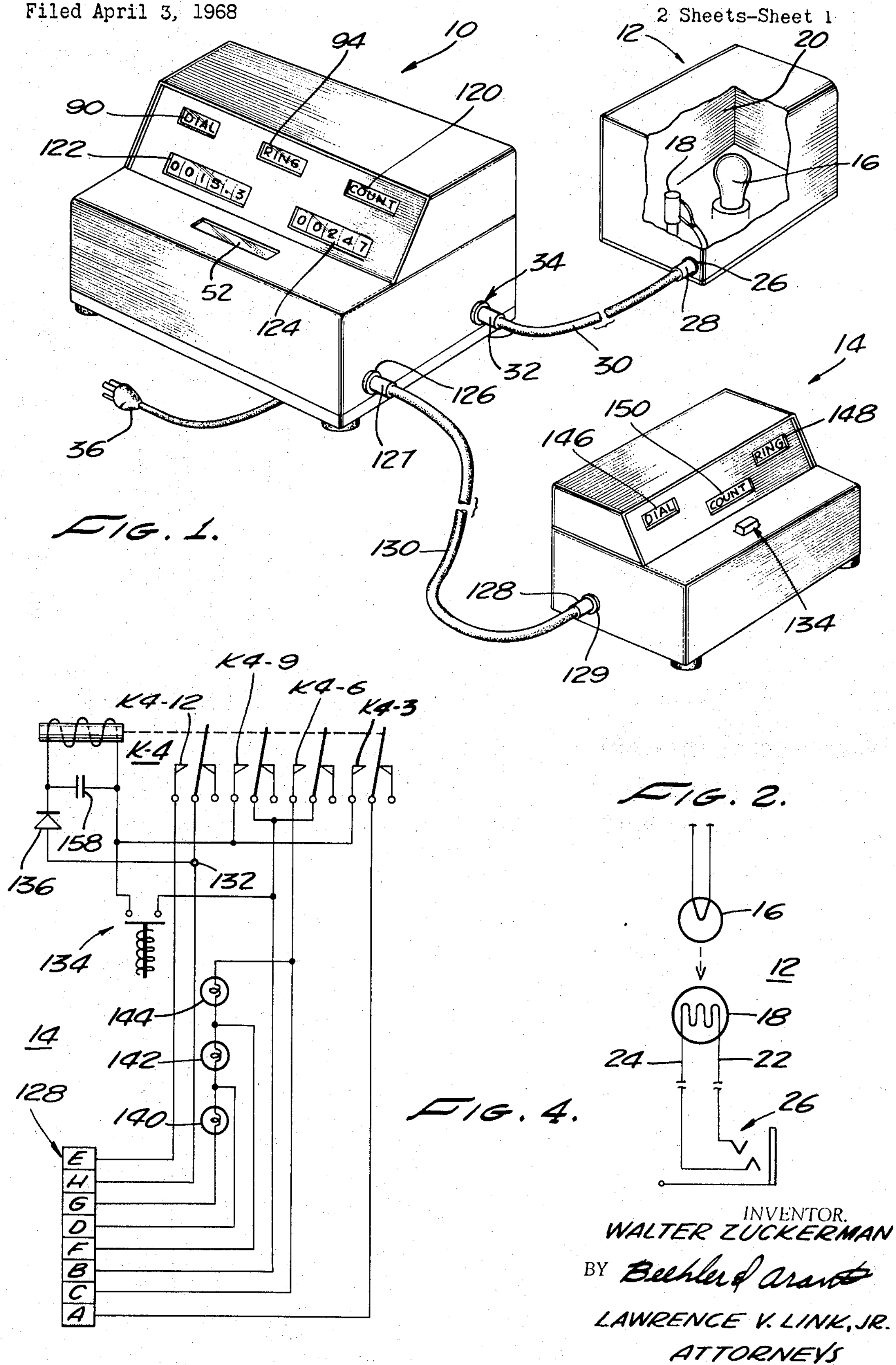
FIG. 1 is a perspective view of the monitor, sensor and remote control units comprising a selected embodiment of the subject invention.
FIG. 2 is a schematic diagram of the sensor unit.
FIG. 4 is a schematic diagram of the remote control unit.
Figure 3:
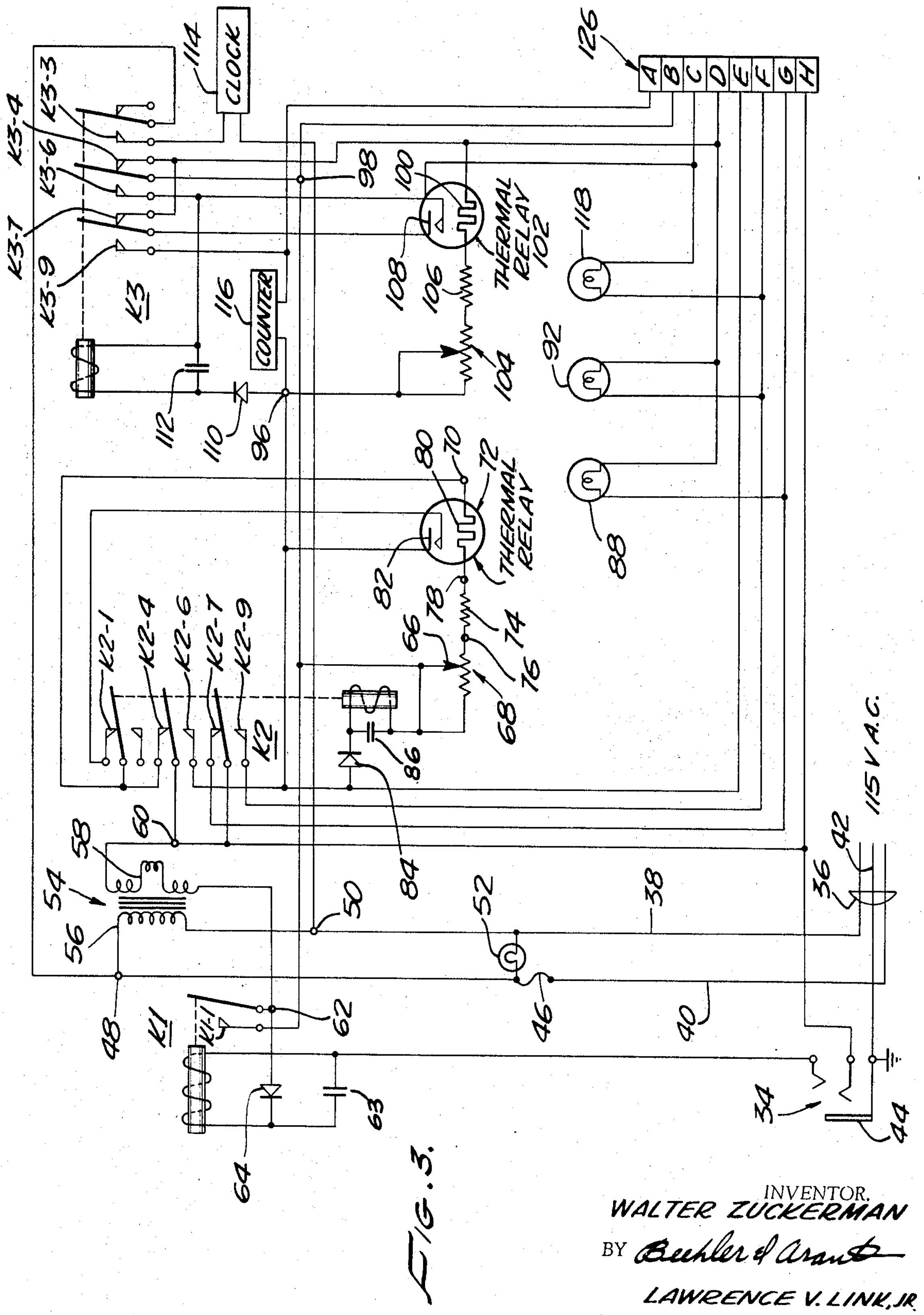
FIG. 3 is a schematic and block diagram of the monitor unit.

In the embodiment of the invention which has been chosen by way of illustration, there is shown in FIG. 1, a monitor unit 10, a sensor unit 12, and a remote control unit 14. The sensor unit 12 has a light source 16 mounted therein and for applications associated with monitoring telephone calls placed on a selected leased line, the light source 16 may be a "line in use" or "busy" lamp which is provided as a normal service at a nominal fee by the several telephone companies. The "line in use" lamp 16 is so connected to the telephone system, by the telephone company, that it is illuminated only when a selected leased line is actuated by removing a telephone head set (not shown) from its cradle (not shown). A light transducer 18 which may be a light sensitive resistor such as type X–6 manufactured by the General Electric Company for example, senses when the lamp 16 is illuminated. The inner surfaces 20 of the sensor unit 12 may have a light reflective finish so as to enhance the operation of the unit and the unit 12 is sealed so that no extranous light may enter. A pair of leads 22 and 24 (FIG. 2) couple the light sensitive resistor 18 to a jack 26; and a plug 28, a cable 30 and a plug 32 further couple the light sensitive resistor to an input jack 34 (FIG. 3) on the monitor unit 10.

An alternating current (AC) voltage is applied by means of a three-pronged plug 36 to input power leads 38 and 40. The center prongs 42 of the plug 36 applies a ground potential to a case 44 of the input jack 34 for personnel safety. The lead 40 is coupled through a fuse 46 to a terminal 48, and the lead 38 is coupled to a terminal 50. An indicator lamp 52 is connected between the terminals 48 and 50, and the lamp 52 is illuminated when prime power is applied to the unit if the fuse 46 is operative.

A transformer 54 which may be a 115 volt to 24 volt step down transformer, for example, has a primary winding 56 coupled in series between the terminals 48 and 50, and a secondary winding 58 is connected in series between a pair of terminals 60 and 62. A diode 64 has an anode terminal connected to the terminal 62 and a cathode terminal connected in series with a coil of a relay K1, the light sensitive resistor 18 and the terminal 60. It should be noted that all relays shown herein are depicted in the deactivated or normally opened position. The characteristics of the light sensitive resistor 18 are such that in a darkened environment, the light sensitive resistor exhibits a very high resistance and therefore the current through the coil of the relay K1 is not sufficient to activate the relay. In an illuminated environment the resistance of the light sensitive resistor 18 is greatly decreased, and therefore the relay K1, the coil of which is connected in series with the light sensitive resistor 18 across the secondary winding 58, is energized. A capacitor 63 is connected across the coil of the relay K1 to provide a filtering effect whereby the relay remains energized during the negative half cycles of the alternating current.

Upon the closure of the relay K1, the terminal 62 is connected to a wiper terminal 66 of a potentiometer 68. The terminal 60 (the other side of the secondary winding 58) is coupled through a contact K2–4 of a relay K2 to a terminal 70 of a thermal time delay relay 72. A resistor 74 is connected between a terminal 76 of the potentiometer 68, and a terminal 78 of the time delay relay 72. Therefore when the relay K1 is closed, the time delay relay 72 is connected in series with a section of the potentiometer 68, the resistor 74, and the secondary winding 58. The relay 72 may be any suitable time delay relay such as a type 12N030 manufactured by the Amperite Corporation. Adjustment of the potentiometer 68 varies the current through a heating element 80 of the thermal relay 72 and therefore controls the time delay between the closure of the relay K1 and the closure of a set of contacts 82, which contacts may include bi-metallic elements. In the telephone monitoring application selected by way of illustration for the embodiment described herein, the delay period of the relay 72 is adjusted by means of the potentiometer 68 to simulate the period between the actuation of the line to be monitored (picking up the telephone head set) and the completion of dialing an outgoing call, for example 15 to 30 seconds.

Upon the closure of the contacts 82 the terminal 60 is coupled through contacts K2–4, K2–1 and 82 so that the secondary winding 58 is connected across the coil of the relay K2, causing the relay K2 to close. The closure of the relay K2 interrupts the current through the heating element 80 at the contact K2–4, and after a thermal delay the contacts 82 open. However the relay K2 is held closed by the connection to the terminal 60 through the contact K2–6. This just described interlock or hold feature of the relay K2 and the delay relay 72 is provided so that the heating element 80 will be activated only during the actual delay period thereby increasing the reliability of the monitor unit 10.

For the selected embodiment, relating to the monitoring of a telephone leased line, the first delay period between the closure of the relay K1 and the subsequent closure of the relay K2 simulates the time period which is required on the average to dial a telephone number. During this dialing delay period, a lamp 88 is connected in series with the secondary winding 58 through contacts K2–7, K3–4 and K1–1. The lamp 88 is mounted in the monitor unit 10 behind a transparent cover plate 90 which cover plate may be inscribed with a descriptive legend such as "DIAL" for example. Upon the closure of the relay K2 at the end of the dial delay period, the electrical circuit through the lamp 88 is interrupted. However with the closure of the relay K2 a lamp 92 is connected across the secondary winding 58 through the contacts K2–9, K3–4 and K1–1. As will be explained subsequently, the lamp 92 is illuminated during a second variable delay period which for the selected embodiment simulates the period between the completion of dialing a telephone number, and the time that the call is answered, that is the "ring" period. The lamp 92 is mounted in the monitor unit 10 behind a transparent cover plate 94 which cover plate may have a descriptive legend such as "RING" inscribed thereon.

During the time period that the contacts 82 or the relay K2 are closed, the terminal 60 is coupled to a terminal 96 through either contacts K2–1 or K2–6 respectively. The terminal 62 is coupled to a terminal 98 through the contact K1–1. Therefore a heating element 100 of a thermal time delay relay 102 is connected across the secondary winding 58 through a portion of a potentiometer 104 and a resistor 106 in a manner similar to that described relative to the thermal delay relay 72. The current to the heating element 100 and therefore the delay period of the thermal time delay relay 102 is adjustable by means of the potentiometer 104 to simulate the average period between the completion of dialing a call and the time the call is answered, for example 15 to 30 seconds. After this delay period, contacts 108 of the thermal time delay relay 102 are closed resulting in the coil of a relay K3 being connected in series with the secondary winding 58 through the contacts 108, K3–7, K3–4, K1–1 and a diode 110. A capacitor 112 is connected in parallel with the coil of the relay K3 to provide filtering as explained previously relative to the discussion of the capacitor 63.

Upon the actuation of the relay K3, the current to the heating element 100 is interrupted as was explained previously relative to the time delay relay 72, and the relay K3 is held closed by current flow through the contact K3–6. Also upon the closure of the relay K3, a clock 114 is connected in parallel with the primary winding 56 through the contact K3–3, and in response thereto the clock 114 accumulates the elapsed time until the circuit through the contact K3–3 is interrupted. It is noted that upon the termination of a call, the resistance of the light sensitive resistor 18 increases, causing relay K1 to open which will result in the opening of the relay K3. Further upon the closure of the relay K3, a counter 116 is coupled across the secondary winding 58 through the contacts K3–9, 108, K3–6, K1–1 and K2–6. Since the delay relay 102 is a thermal device, the contacts 108 remain closed for a short time period, for example 15 seconds after the current through the heating element 100 has been interrupted by closure of the relay K3. Therefore during the time period during which both contacts 108 and relay K3 are closed, current flows through the counter 116. The counter 116 may contain a conventional drive mechanism, such that the count is increased one-half count upon the application of current, and is increased a second one-half count when current is interrupted by the opening of the contacts 108.

Further, upon the closure of the relay K3, the current to the lamp 92 is interrupted at the contact K3–4 and a lamp 118 is illuminated in response to current flow through the secondary winding 58, contacts K2–9, K3–6 and K1–1. The lamp 118 is mounted in the monitor unit 10 behind a transparent cover plate 120 which may have a legend such as "COUNT" inscribed thereon, to indicate that during the time period that the lamp 118 is illuminated, that the elapsed time period is being recorded by the clock 114.

The clock 114 may have a digital type display readout 122, which may indicate elapsed time in hours and tenths of hours, for example, on the display surface of the monitor unit 10. Similarly the counter 116 may have a digital type display readout 124 on the display surface of the monitor unit 10.

The monitor unit 10 is electrically connected to the remote control unit 14 by connectors 126 through 129, and a cable 130. The connectors 127 and 128 are so wired that the pins A through H of the connector 126 (FIG. 3) are connected to the correspondingly labeled pins of the connectors 128 (FIG. 4). The purpose of the remote control unit 14 is to allow an operator, when available, to override the delay circuits discussed previously so as to improve the accuracy of the monitor unit 10 by incrementing the counter 116 and actuating the clock 114 the instant a call is completed. To accomplish this function, the terminal 60 (one side of the secondary winding 58) is connected through pins H (connectors 126 and 128) to a terminal 132 (FIG. 4); and the terminal 62 (the other side of the secondary winding 58) is connected through the contact K1–1 and pins B to one terminal of a push button switch 134. Actuation of the switch 134, when the relay K1 is closed (when the line is in use) connects a coil of a relay K4 in series with a diode 136 and the secondary winding 58, thereby closing the relay K4. A filter capacitor 158 is coupled in parallel with the coil of the relay K4. Also pin B is coupled through a contact K4–9 so as to hold the relay K4 closed and pin B is coupled through the contact K4–6 and pins C so as to cause the relay K3 to close. Further upon the closure of the relay K4, the terminal 60 is coupled through the pins H, contact K4–12 and pins E to the anode terminal of the diode 84 (FIG. 3), thereby causing relay K2 to close. When the relay K4 is closed, the terminal 62 is connected through pins B, contacts K4–9, K4–3 and pins A, so as to complete the circuit to the counter 116. Lamps 140, 142 and 144 are connected in parallel with the lamps 88, 92 and 118 respectively. Lamp 140 is mounted in the remote control unit 14 behind a transparent cover plate 146, which cover plate may have the legend "DIAL" inscribed thereon. Similarly lamps 142 and 144 are mounted behind transparent cover plates 148 and 150 respectively, and said cover plates 148 and 150 may have the legends "RING" and "COUNT" respectively inscribed thereon.

In the operation of the system in accordance with the principles of the subject invention, when a head set of a telephone (not shown), connected to a leased line to be monitored, is lifted from its cradle (not shown) the "line in use" lamp 16 is illuminated and the light sensitive resistor 18 responds thereto causing the relay K1 to close. The closure of the relay K1 causes the "dial" lamps 88 (FIG. 3) and 140 (FIG. 4) to be illuminated and also activates the thermal time delay relay 72. After a delay period which simulates the average time required for dialing, the delay relay 72 closes thereby causing the closure of the holding relay K2, which extinguishes the lamps 88 and 140 and illuminates the "ring" lamps 92 and 142. Also the closure of the relay K2 activates the time delay relay 102 and after a delay period, adjustable by the potentiometer 104, the time delay relay 102 closes thereby causing the relay K3 to close, which extinguishes "ring" lamps 92 and 142, and illuminates the "count" lamps 118 and 144. Closure of the relay K3 causes the counter 116 to increment one count and the clock 114 to accumulate the elapsed time from the end of the "ring" delay period until the call is terminated. Upon the termination of the call, the "line in use" lamp 16 is extinguished and the monitor unit 10 is returned to a standby condition by the opening of the relay K1. If the call is terminated before the end of the two delay periods, the system automatically returns to the standby condition without incrementing the counter or recording elapsed time.

Reset means may be incorporated into the clock 114 and the counter 116 so that these devices can reset at the beginning of each billing period. However such reset means have not been included in the selected embodiment because the economy and accuracy of the apparatus are belived to be enhanced if the readings from the clock and counter are simply recorded at the beginning of each billing priod; with the difference between the present readings and the recorded readings being indicative of the utilization time and number of calls placed respectively. Therefore the counter 116 and the clock 114 of the selected embodiment are of the type without manual reset devices, but which automatically return to a zero condition after a maximum reading has been recorded.

The remote control unit 14 may be located at a switch board position removed from the monitor 10 and the sensor 12 units, which latter units may be situated at any convenient location. By means of the lamps 140, 142 and 144, a remote operator may determine the operational mode of the monitor unit and if it is noticed that a call is answered before the end of the "ring" delay period, the operator may depress the push button 134, which immediately places the apparatus of the subject invention in the count or record mode. This remote override feature allows increased accuracy; however, it should be recalled that one of the primary functions of the subject invention is to provide an estimate of a leased line usage and that perfect accuracy is not required.

The apparatus of the subject invention may operate automatically, or may be controlled from a remote station such as a switch board. The monitor unit 10 instantaneously goes to a ready position whenever a number is being dialed. However at this point no readings are taken on the counter 116 or the clock 114 since calls are only counted by the telephone company if answered. The instant a call is answered, a switch board operator may depress the push button 134 on the remote unit 14 and the elapsed time of the call begins immediately to register on the clock 114; and the counter 116 is incremented by a count of one. Should for any reason the switch board operator fail to press the button 134 on a completed call, the apparatus of the invention proceeds autocatically to accurately estimate and record the elapsed time of the call and to count the call. Should the call not be answered and the line be cleared during the preset dial or ring delay periods, then no elapsed time is recorded and the call is not counted.

It should be noted that only one monitor unit is required for a specific leased line regardless of the number of extensions having use of the line. However if records of line usage by departments are desired, additional monitors may be used in conjunction with each extension.

Thus there has been described a reliable and economical device for recording the accumulated time, after adjustable delay periods, of a command signal and for counting the number of such command signals which exceed the delayed periods. In the particular embodiment described herein by way of illustration, the apparatus is utilized in association with a telephone leased line to accurately estimate the usage of the line without electrical or mechanical connections to the telephone system. It should be noted that while the invention has herein been shown and described in what is conceived to be the most practical and preferred embodiment, it is realized that departures may be made therefrom within the scope of the invention which is not limited to the details disclosed herein, but is to be afforded the full scope of the claims so as to embrace any and all equivalent devices.

Having described the invention, what is claimed as new in support of the Letters Patent is:

1. An apparatus for measuring the time duration of control signals in excess of a plurality of time delay periods, and for counting the number of control signals of a time duration that exceeds the plurality of delay periods, said apparatus comprising:

a source of control signals;

a transducer for responding to said control signals;

switching means, coupled to said transducer for providing an actuation signal;

a plurality of series connected delay circuits, with said plurality of delay circuits having an input circuit coupled to said switching means and responding to said actuation signal, and having an output circuit;

a timer coupled to said output circuit for registering the time duration of the control signals in excess of the delay periods of said plurality of delay circuits; and a counter coupled to said output circuit for counting the number of control signals which exceed the delay period of said plurality of delay circuits.

2. The apparatus of claim 1 further comprising:

a remote control unit electrically coupled to said switching means, said remote control unit having an override circuit coupled to said timer and to said counter, whereby said timer and said counter are responsive to said override circuit during the presence of the activation signal and prior to the termination of the delay periods of said plurality of delay circuits.

3. The apparatus of claim 2 wherein said source of control signals comprises a light source and said transducer includes a light sensitive resistor.

4. The apparatus of claim 3 wherein each of said plurality of delay circuits includes a potentiometer, a thermal time delay relay having a heating element and a set of contacts, and a holding relay, with said potentiometer coupled in series with said heating element and said holding relay coupled to said set of contacts.

5. In combination with a "line in use" lamp, an apparatus for registering the usage of a telephone line comprising:

a transducer for responding to light energy emitted from the "line in use" lamp;

switching means coupled to said transducer for providing an actuation signal during the time period the "line in use" lamp is illuminated;

delay means responding to the actuation signal for providing a delay signal, with said delay signal commencing a selected time delay period after the occurrence of the actuation signal and terminating upon the termination of the actuation signal; and a clock device coupled to said delay means and responding to the delay signal so that said clock device registers the time period of the duration of the delay signal.

6. The apparatus of claim 5 further comprising a counter coupled to said delay means and responding to said delay signal so that said counter counts the number of actuation signals of a time duration which exceed the delay period of said delay means.

7. The apparatus of claim 6 further comprising a manual control circuit coupled to said switching means, said colck device and said counter, whereby said clock device and counter are responsive to the manual control circuit during the presence of said actuation signal.

8. The apparatus of claim 6 wherein said transducer is a light sensitive resistor.

9. The apparatus of claim 8 wherein said delay means includes first and second adjustable delay circuits coupled in series, with said first delay circuit being adapted for simulating the average time for dialing a telephone call, and with said second delay circuit being adapted for simulating the average time for a call to be answered after the dialing has been completed.

10. The apparatus of claim 9 wherein said first and second adjustable delay circuits include a potentiometer, a thermal time delay relay having a heating element and a set of contacts, and a holding relay, with said potentiometer coupled in series with said heating element and said holding relay coupled to said set of contacts.

11. The apparatus of claim 9 further comprising first and second lamps for indicating the time of occurrence of said first and second delay periods respectively and a third lamp for indicating the time period during which the clock device is activated.

12. The apparatus of claim 11 further comprising: a remote control unit electrically coupled to said switching means, said remote control unit having a manual control circuit coupled to said clock device and to said counter whereby said manual control circuit may control the actuation of said clock device and said counter during the presence of said actuation signal and prior to the termination of said first and second delay periods; and said remote control unit further having fourth and fifth lamps for indicating the time of occurrence of said first and second delay periods respectively, and a sixth lamp for indicating the time period during which the clock device is activated.

13. The apparatus of claim 10 further comprising interlock means, coupled between said thermal time delay relay and said holding relay, for inactivating said heating element at the end of the delay period associated with each thermal time delay relay.

No references cited.

KATHLEEN H. CLAFFY, Primary Examiner

J. S. BLACK, Assistant Examiner

U.S. Cl. X.R.

58—145